J. E. BURNS.
GROOVING TOOL.
APPLICATION FILED DEC. 6, 1915.
1,259,077.
Patented Mar. 12, 1918.
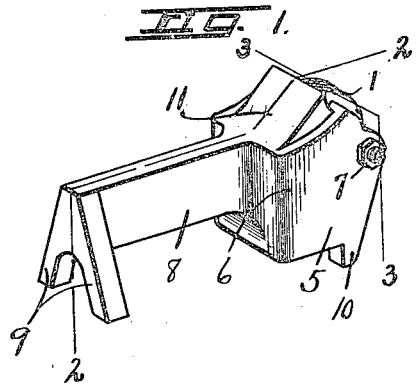
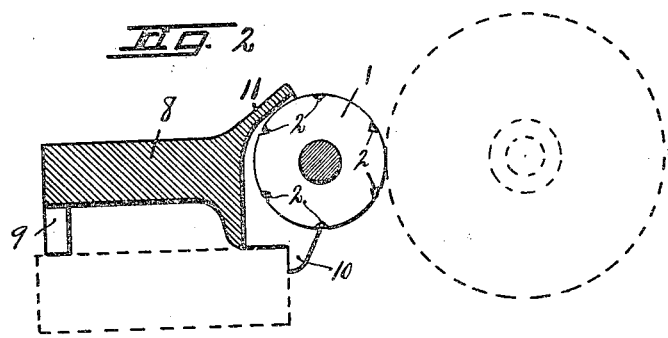
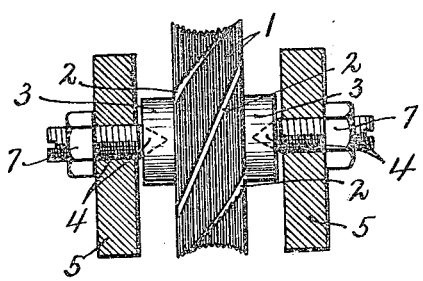

UNITED STATES PATENT OFFICE.

JOSEPH E. BURNS, OF CANASTOTA, NEW YORK.

GROOVING-TOOL.

1,259,077.  Specification of Letters Patent.  Patented Mar. 12, 1918.

Application filed December 6, 1915. Serial No. 65,437.

*To all whom it may concern:*

Be it known that I, JOSEPH E. BURNS, a citizen of the United States of America, and resident of Canastota, in the county of Madison, in the State of New York, have invented new and useful Improvements in Grooving-Tools, of which the following, taken in connection with the accompanying drawings, is a full, clear, and exact description.

This invention relates to certain improvements in grooving tools particularly adapted for producing alternate circumferential channels and cutting edges on alundum and similar wheels for simultaneously making a plurality of miter cuts in glassware.

In this character of tools it is quite essential to the production of perfect miter cuts that the cutting edges upon the alundum wheel should be absolutely parallel and uniformly perfect in shape and size. Heretofore attempts have been made to cut the circumferential grooves or miters in alundum wheels singly by diamond pointed or other tools, in which case it is practically impossible to make the cutting edges parallel. It has also been attempted to groove carborundum wheels by a tool having alternate grooves and continuous uninterrupted ridges, such tools having handles positioned upon opposite sides of the wheel which the operator may grasp in holding the cutting wheel against a carborundum or emery wheel.

The latter tool is not adapted for use with alundum wheels, due to the relative hardness and difficulty of cutting such wheels as distinguished from carborundum or emery wheels, and in practice it is found substantially impossible for an operator to hold the wheel absolutely true and this is essential as even a slight tilting movement of the grinding wheel breaks off the cutting edges and destroys the shape and uniformity of the miters, and the slightest defect in the cutting edges or miters upon the alundum wheel produces in turn corresponding defects in the glass cut thereby.

One of the objects, therefore, of this invention is to produce a tool that may rest securely upon a suitable rigid platform during the cutting operation, whereby uniform and perfect cutting edges are produced upon the alundum wheel.

Another object resides in the production of a grooving tool that will form such cutting edges on wheels made of hard substances, such as alundum, as the known wheel having continuous ridges is practically useless for this purpose.

Other objects and uses will appear from the following description, taken in connection with the accompanying drawings, in which—

Figure 1 is a perspective view of the tool.

Fig. 2 is a cross section on line 2—2, Fig. 1.

Fig. 3 is a cross section on line 3—3, Fig. 1.

The invention comprises a circular wheel —1— having a concaved edge provided with a series of alternate circumferential grooves and cutting edges, of any size and any number desired, the cont nuity of such grooves and cutting edges being interrupted at spaced points by grooves —2— extending across and around the wheel and obliquely disposed with respect to the grooves and ridges, thereby forming a series of alined cutting edges and alined grooves about the circumference of the wheel spaced by relatively narrow obliquely di posed channels.

The wheel —1— is provided with bosses —3— projecting from opposite sides thereof, each boss provided with a laterally extending conical seat or bearing for the reception of conical journals —4— externally threaded and engaged with internally threaded portions of the side walls —5— of a case —6— forming portions of the supporting framework of the tool. Each of the bearings —4— is provided with a locking nut —7— for holding the journals in any position of adjustment. By tightening the journals and adjusting them as desired, the wheel —1— will run perfectly true and the cutting edges formed upon the alundum or other wheel will in turn be uniform and perfect.

The supporting framework of the tool further comprises a bar —8— extending rearwardly from the case —6— and terminating in V-shaped downwardly diverging legs —9—. The bottom of the legs —9— lies substantially in the same plane as the lower portion of the body of the case —6— to form spaced flat supporting planes for the tool, and adapted to rest upon a suitable table indicated in dotted lines Fig. 2, and the side portions —5— are provided at their front portions with depending projections —10— having their rear faces formed along straight lines and lying in the same plane and adapted to abut against the front edge of the supporting table, as shown in Fig. 2. By the supporting frame disclosed, associated with a suitable table, the grooving tool is held rigidly in its initial position and all tilting and lateral movement of the tool is prevented, which latter movements render the tool practically useless.

The case —6— is provided with a hood —11— inclined upwardly therefrom and lying over the wheel —1— to prevent the abradant used or the particles of alundum from flying into the face of an operator.

In operation, the obliquely disposed channels —2— not only serve to carry off the particles of abradant, if used, and the particles of the alundum or other wheel being grooved, but they also serve to break up the continuity of the circumferential cutting edges on the wheel, forming abrupt, sharp cutting points at the opposite terminals of the elongated cutting edges, rendering the wheel capable of cutting miters in wheels formed of very hard material such as alundum.

In certain respects, a wheel embodying the obliquely disposed channels is capable of performing the same character of cutting as a toothed wheel and at the same time, due to the elongated nature of the cutting edges, is capable of forming smooth uniform miters which cannot be produced by toothed wheels. The wheel of this invention is, therefore, a distinct improvement over both the toothed wheel and the wheel having continuous smooth cutting edges.

Preferably, the supporting framework, including the entire tool except the wheel —1— and journals —4—, is formed of a single metallic casting, as shown, but I do not desire to limit myself to such formation or construction of the supporting framework, or to any particular shape, size or method of assemblage of the parts of the grooving tool, as many changes may be made in the details of form, construction and arrangement while retaining the essence of the invention and without departing from the spirit of this invention as set forth in the appended claims.

What I claim is:—

1. A device for grooving glass cutting stones comprising a wheel having a plurality of separate parallel forming ridges, each ridge interrupted by a plurality of cross grooves forming a series of arcuate elongated smooth spaced grooving edges traveling in planes perpendicular to the axis of rotation of the wheel and adapted to simultaneously form a plurality of alternate grooves and ridges upon a glass cutting stone, and means for rotatably supporting the wheel upon a stationary axis.

2. A device for grooving glass cutting stones comprising a rotatable wheel having a circumferential cutting edge lying in a plane perpendicular to the axis of the wheel, a case having a rear wall and side walls extending substantially radially of the axis of the wheel and having journals for rotatably carrying the wheel, a plane surface formed at the base of the rear wall and the side walls of the case and at a point below the adjacent portion of the periphery of the wheel, an arm extending rearwardly from the rear wall and having a plane at its rear and lying in substantially the same plane as the plane surface formed at the base of the rear wall and the side walls.

3. A device for grooving glass cutting stones comprising a rotatable wheel having a circumferential cutting edge lying in a plane perpendicular to the axis of the wheel, a case having a rear wall and side walls extending substantially radially of the axis of the wheel and having journals for rotatably carrying the wheel, a plane surface formed at the base of the rear wall and the side walls of the case and at a point below the adjacent portion of the periphery of the wheel, and a hood inclined upwardly over the wheel and connected to the rear wall and the adjacent portions of the side walls.

In witness whereof I have hereunto set my hand this 29th day of November, 1915.

JOSEPH E. BURNS.

Witnesses:
E. A. THOMPSON,
M. VIOLA HOWLAND.